May 14, 1968     E. A. HOLLENBACH     3,382,994

FORKLIFT TRUCK

Filed Dec. 14, 1965     8 Sheets-Sheet 1

FIG. 1

INVENTOR.
Edwin A. Hollenbach,
BY
Paul & Paul
ATTORNEYS.

May 14, 1968  E. A. HOLLENBACH  3,382,994
FORKLIFT TRUCK
Filed Dec. 14, 1965   8 Sheets-Sheet 2

FIG_2_

INVENTOR.
Edwin A. Hollenbach,
BY
Paul & Paul
ATTORNEYS.

May 14, 1968   E. A. HOLLENBACH   3,382,994
FORKLIFT TRUCK
Filed Dec. 14, 1965   8 Sheets-Sheet 6

POSITION & INSERT FORKS   FIG. 7

LIFT & RETRACT LOAD   FIG. 8

INVENTOR.
Edwin A. Hollenbach,
BY
Paul & Paul
ATTORNEYS.

United States Patent Office 3,382,994
Patented May 14, 1968

3,382,994
FORKLIFT TRUCK
Edwin A. Hollenbach, Paoli, Pa., assignor to Drexel Dynamics Corporation, Horsham, Pa., a corporation of Pennsylvania
Filed Dec. 14, 1965, Ser. No. 513,713
12 Claims. (Cl. 214—671)

ABSTRACT OF THE DISCLOSURE

A load-lift vehicle is disclosed having two powered spaced-apart non-steerable front wheels and a single non-powered steerable rear wheel assembly. The load-lifting fork and mast are supported on the outer section of a two-section articulated support arm, the inner section of which pivots horizontally about a vertical support shaft located at the front corner of the vehicle, preferably over the left front wheel. The outer section pivots about the outward end of the inner section. Means are provided for operating the vehicle in either one of two modes. In one mode (FIGS. 7–9), the inner and outer sections of the two-section support arm are pivoted simultaneously through equal angles but in opposite directions thereby maintaining fixed the orientation of the load relative to ground. Simultaneously, the vehicle is moved in a straight line in a coordinated manner to maintain the load on a fixed transverse line. In the other mode (FIGS. 10–11) the outer section of the two-section support arm is held fixed relative to the inner section as the vehicle is swung under the load, to tuck the load into carry position on the side of the vehicle. Here again the orientation of the load relative to ground is maintained fixed.

---

This invention relates to a material handling forklift vehicle adapted for either front lifting or side lifting.

More particularly, the present invention provides a forklift vehicle which may approach the stack with the tines of the fork extended either forwardly from the front of the vehicle or laterally therefrom. During transportation, the load may be carried forward of the front wheels of the vehicle, or the load may be "tucked" on to the side of the vehicle with the long dimension of the load lengthwise of the line of travel.

A principal object of the invention is to provide a highly versatile forklift vehicle capable of operating in narrow aisles not much wider than the width of the vehicle.

Another object is to provide a vehicle of the foregoing type in which the load may be carried at the outer end of an articulated support arm having an inner section and an outer section, the outer section being pivotable about a secondary pivot point located at the outer end of the inner section, the inner section being supported in cantilever fashion from the main chassis and pivotable about a primary pivot point located at a front corner of the vehicle.

A further object is to provide a vehicle of the foregoing type in which the primary pivot point is located over the center line of one of the front wheels of the vehicle, and the vehicle is adapted to be swung about said primary pivot point.

Another object is to provide a forklift vehicle of the foregoing type in which the combined center of gravity of the load and vehicle swings in toward the vehicle as the vehicle is swung about the primary pivot point.

Another object is to provide a forklift vehicle of the foregoing type in which, when the inner section of the articulated support arm is driven rotationally through an angular distance, the outer section of the articulated support arm, which supports the fork and the load, is rotationally driven through an equal angle but in the opposite direction, thereby to maintain the orientation of the load relative to ground.

Another object is to provide a forklift vehicle of the foregoing type in which the vehicle may be swung about a pivot point which remains substantially fixed, and in which the load may be maintained stationary relative to ground as the vehicle is swung under the load.

Another object is to provide a vehicle of the foregoing type in which the operator's seat, and the controls for operation of the vehicle, are located on the outer section of the articulated support arm, thereby to allow the operator to be close to the load at all times, and to give the operator a continuous and close-up view of the fork tines during loading and unloading.

Speaking generally, the forklift vehicle of the present invention combines into one vehicle the characteristic advantages of both front and side loading vehicles. It may be used to special advantage in the handling of loads of substantial length, particularly in narrow aisles since the aisle width required to handle such loads is not much greater than the width of the vehicle.

The forklift vehicle of the present invention may be considered as having three main components: (1) the vehicle chassis; (2) the articulated or two-section support arm pivotally supported at one end at a front corner of the vehicle chassis; and (3) the fork and mast supported on the outer section of the two-section support arm.

The above vehicle may be used in either one of two modes; (A) one in which the outer section of the two-section support arm is pivotally moved through an angle equal to, but opposite in direction from, to the angle of movement of the inner section; and (B) one in which the outer section is held in fixed relation to the inner section.

In mode (A), the load retains a fixed orientation relative to the side of the aisle as the vehicle and articulated support arm are moved to extract the load from the stack and position it in the tuck position on the side of the vehicle.

In mode (B), the load remains stationary relative to ground as the vehicle is swung under the load to tuck the load on to the side of the vehicle. In mode (B), the center of gravity of the load never leaves the wheel triangulation, thus providing full stability.

The invention will be clear from a consideration of the following description of one form of forklift vehicle of the invention selected for illustration in the drawings in which.

Figure 7:
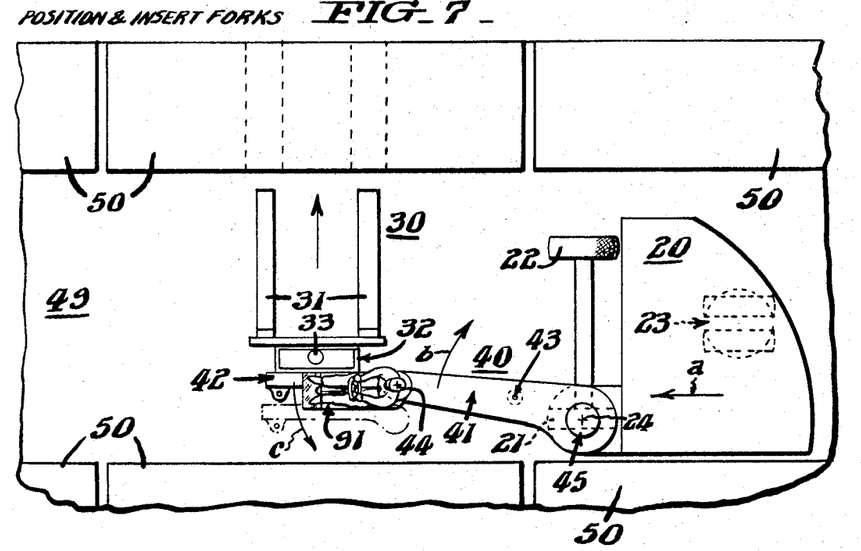
FIGS. 7, 8, and 9 are diagrammatic plan views illustrating the operation of the vehicle in mode (A)
Figure 8:
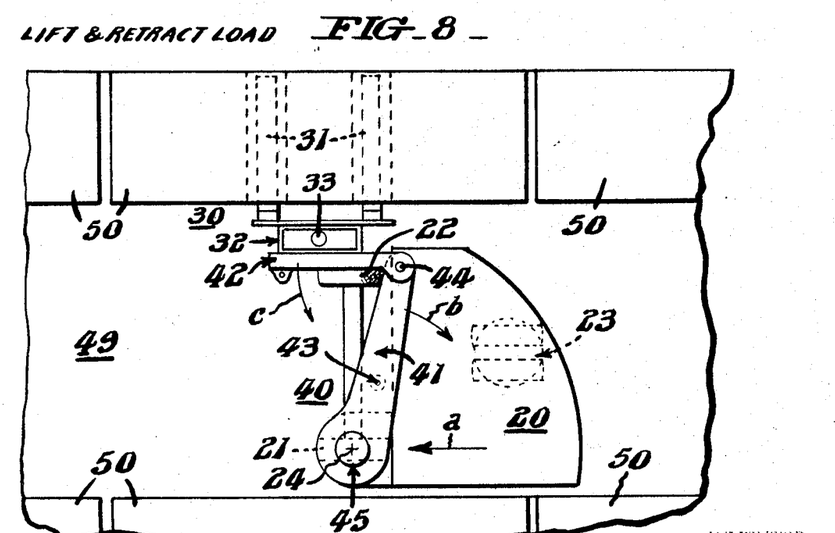
Figure 9:
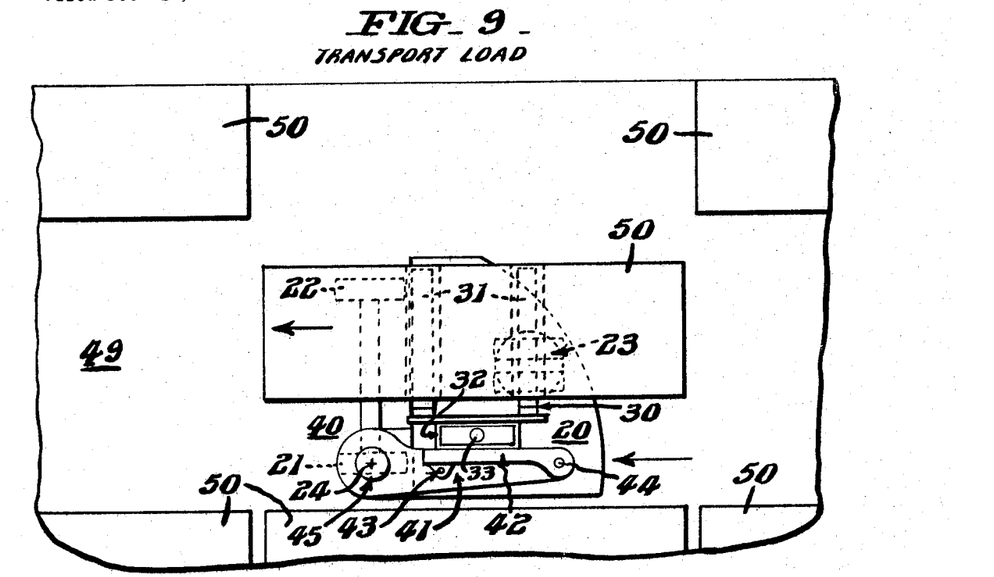

Reference will first be made to FIGURES 7, 8 and 9 which illustrate diagrammatically the operation of the forklift vehicle in mode (A). The vehicle includes, as its major components, the chassis 20 which is self-powered, the fork 30 which is elevatable on the mast 32 which is tiltable, and an articulated two-section support arm 40 having an inner section 41 and an outer section 42. The mast 32 and fork 30 are secured to the outer section 42. The inward end of the outer section 42 is secured pivotally to the outward end of the inner section 41.

The inward end of the inner section 41 of the articulated support arm 40 is pivotally secured to the vehicle chassis and is pivotal about a pivot point 24 located over the left front wheel 21 of the chassis 20. The chassis 20 is provided with a pair of spaced-apart front wheels 21 and 22, neither of which is steerable. Steering of the vehicle is accomplished by turning the rear wheel assembly 23. The driver's seat and the necessary control mechanisms for operating the vehicle are mounted on the outer section 42 of the articulated support arm 40.

FIGS. 7, 8, and 9 are diagrammatic plan views illustrating a narrow aisle 49 whose width is but very little greater than that of the chassis 20 of the vehicle. Elongated loads 50 are shown stacked on either side of the aisle. In FIG. 7, the two-section support arm 40 is shown extended fully forward with the tines 31 of the fork 30 directed laterally, toward the load 50.

Referring again to FIG. 7, to pick up the load, the vehicle chassis 20 is moved forward in the direction of the arrow (a), and simultaneously, the inner section 41 of support arm 40 is driven rotationally clockwise, in the direction of the arrow (b). The angular movement of inner section 41 automatically rotates the outer section 42 counter-clockwise, in the direction of the arrow (c). The angle through which the outer section 42 is moved counter-clockwise is equal to the angle through which the inner section 41 is moved clockwise. Thus, the orientation of the fork 30 relative to the load 50 remains unchanged as the tines 31 of the fork are inserted under the load. The positions acquired by the chassis 20, the articulated support arm 40 and the tines of the fork 30, are illustrated diagrammatically in FIG. 8.

With the vehicle in the position illustrated in FIG. 8, the outward end of inner section 41, at the pivot point 44, is supported on the frame of the chassis 20, and the fork is now raised on the mast 32 to lift the load. The mast is also tilted. The chassis 20 is then driven further forward in the direction of the arrow (a) and simultaneously the inner section 41 is driven further clockwise, in the direction of the arrow (b) of FIG. 8. The outer section 42 rotates automatically counter-clockwise, in the direction of the arrow (c) through an angle equal to that through which the inner section 41 is moved.

As a result of the movement described above, the load 50 is withdrawn from the stack, and the vehicle and load acquire the position illustrated diagrammatically in FIG. 9. The outer section 42 of the two-section support arm 40 is now locked to the inner section 41 by the locking device 43. The load 50 is now in the tuck position on the side of the chassis 20, and the chassis and load may move down the narrow aisle 49 whose width, as indicated above, is but slightly greater than the width of the chassis 20.

Figure 10:
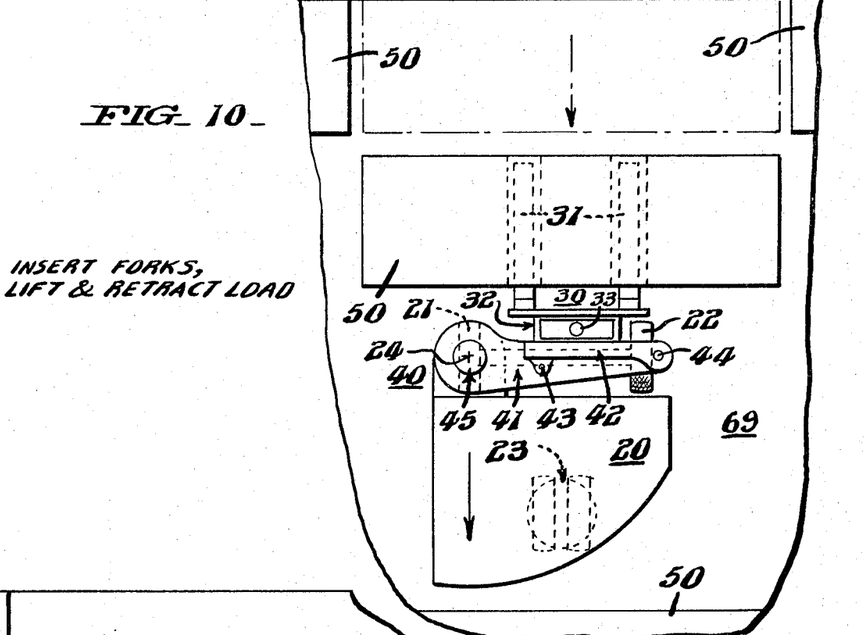
FIGS. 10 and 11 are diagrammatic plan views illustrating the operation of the vehicle in mode (B)
Figure 11:
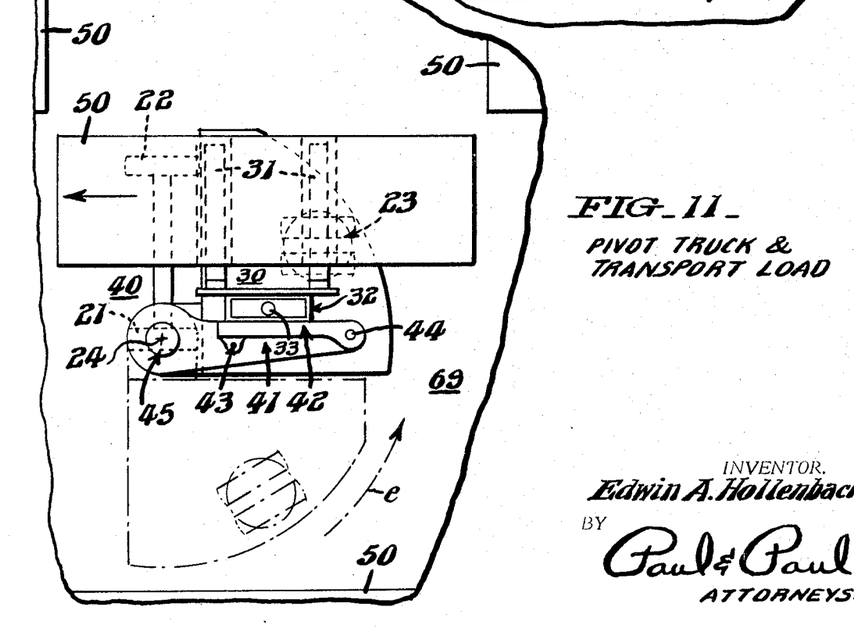

FIG. 10 illustrates the load 50 on the fork 30 with the tines 31 extending forwardly from the chassis 20 and the articulated two-section support arm 40 in closed locked position. Where the aisle 69, as illustrated in FIGS. 10 and 11, has a width greater than the overall dimension of the forklift vehicle with the fork extending forwardly from the chassis and the articulated support arm 40 in closed locked position, the closed locked position of the articulated support arm need not be disturbed in the handling of the load. This mode of operation, referred to hereinbefore as mode (B), is illustrated in FIGS. 10 and 11. In FIG. 10, the load 50 is shown being withdrawn from its stacked position. In FIG. 11, the chassis 20 has been swung about pivot point 24 in the direction of the arrow (e) from its original position (shown in solid line in FIG. 10 and in dot-and-dash line in FIG. 11) to the tuck or carry position, shown in solid line in FIG. 11.

When the chassis 20 is pivoted about the pivot point 24 and swung under the load 50, the load 50 remains substantially stationary. This may be accomplished by locking the left front wheel 21, driving the right front wheel 22 forwardly, and turning the rear wheel assembly, as indicated in FIG. 11.

The foregoing summarizes the two modes of operation of the vehicle.

Figure 6:
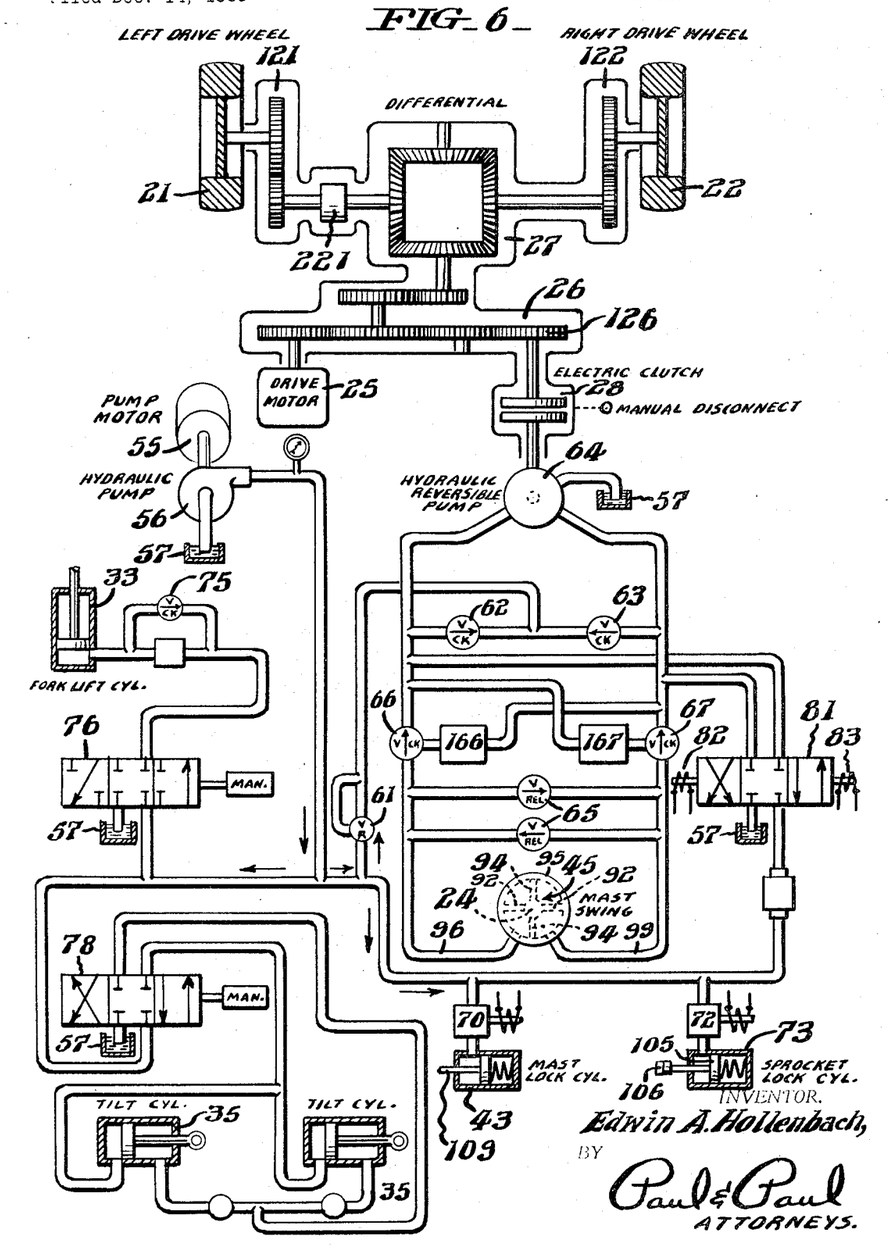
FIG. 6 is a schematic illustration of a suitable drive and control system for the vehicle.

Referring now to FIG. 6, this figure shows one form of drive and hydraulic control system suitable for the forklift vehicle. The vehicle may be driven by a main drive motor 25 powered by batteries, not shown, motor 25 drives the front wheels 21 and 22 through suitable change gearing 26, differential 27, and drive gears 121 and 122.

Change gearing 26 is shown to include a gear 126 which is connected through an electric clutch 28 to a hydraulic reversible metering pump 64. The electric clutch 28 is manually controlled, as by a push button. Pump 64 pumps metered fluid through a suitable check valve 66 or 67 to one side or the other of a fluid torque motor 45 so mounted that its axis of rotation is at the pivot point 24 at the inward end of the articulated mast support arm 40. Suitable pressure relief valves 65 are provided.

Fluid for the hydraulic system of the swing motor 45 is derived from the main system through a pressure reducing valve 61 and through the replenishing check valves 62 and 63. These check valves automatically control the replenishing of fluid to the mast swing system as required. Check valves 66 and 67 are pressure operated by the pressure devices 166 and 167, respectively.

Hydraulic pressure for the main system is derived from a pump 56 supplied from reservoir 57 and driven by pump motor 55. Pressure derived from pump 56 is used to operate the forklift cylinder 33, the tilt cylinders 35, the mast locking cylinder 43, and the sprocket locking cylinder 73. The forklift cylinder 33 is controlled by the manually operable control valve 76. Check valve 75 controls dumping of the fluid.

The pair of tilt cylinders 35 are controlled by the manually operable reversing valve 78.

Mast locking cylinder 43 is shown to be spring loaded in the locking direction, and is unlocked by fluid pressure controlled by solenoid valve 70. Sprocket locking cylinder 73 is spring loaded in the locking direction and is unlocked by fluid pressure controlled by the solenoid valve 72.

The electric clutch 28 is operable by the operator to disconnect the mast swing mechanism from the drive, that is, to disconnect the pump 64 and fluid torque motor 45, from the drive gearing 26. The operator makes this disconnection when he wants merely to drive the forklife vehicle without swinging the mast, that is, without swinging the articulated two-section support arm 40.

It will be observed that when the electric clutch 28 is connected, the pump 64 and fluid motor 45 are driven by the change gearing 26, and that movement of the vehicle causes a related movement of the two-section support arm 40 rotationally about the pivot point 24. A correction control 81 is provided for correcting the orientation of the fork 30 relative to the vehicle chassis 20. This may be accomplished by reversing the hydraulic pressure from pump 64 to the fluid torque motor 45, by actuating the solenoid actuatable reversing cylinder 81. This provides a manual over-ride to allow the operator to compensate or correct for wheel slippage and for other forces and factors which may cause the fork 30 and vehicle chassis 20 to get out of phase.

Reference will now be made to FIGS. 1–5 wherein is illustrated the structural details of one form of vehicle capable of performing in the manner and modes indicated hereinabove. Only those components and parts which are essential to an understanding of the basic design of the vehicle embodying the invention claimed herein have been illustrated in the drawings.

The vehicle chassis 20 includes an under frame 51 supported on a pair of spaced-apart front drive wheels 21 and 22 and a centered rear wheel assembly 23. Front wheels 21 and 22 are neither steerable nor turnable. Both may be driven, or the left front wheel 21 may be locked, as by brake 221, and the right front wheel 22 driven to swing the vehicle around the pivot point 24 which is located immediately above the center point of the left front wheel. To swing the vehicle about pivot point 24, the rear wheel assembly is turned, as indicated in FIG. 11. Suitable controls for operating the vehicle are provided in the control housing 85 below the steering wheel 86. The controls are primarily electric for control of the drive motor 25, steering motors (not shown), electric clutch 28, pump motor 55, solenoid valves 70, 72, 82, 83, etc.

A seat 91 is provided for the operator mounted on the outer section or arm 42 of the two-section articulated support arm. The controls in control column 85 are within easy reach of the operator. Steering wheel 86 controls, as by sliding electric contact and suitable electrical connections, the electric motor (not shown) which turns the rear wheel assembly 23.

As has already been indicated, the fork 30 and mast 32 are supported on the outer section or arm 42 of the articulated two-section support arm. The inner arm 41 is supported for pivotal movement about an axis 24 located above the center of the left front wheel 21.

Figure 5:
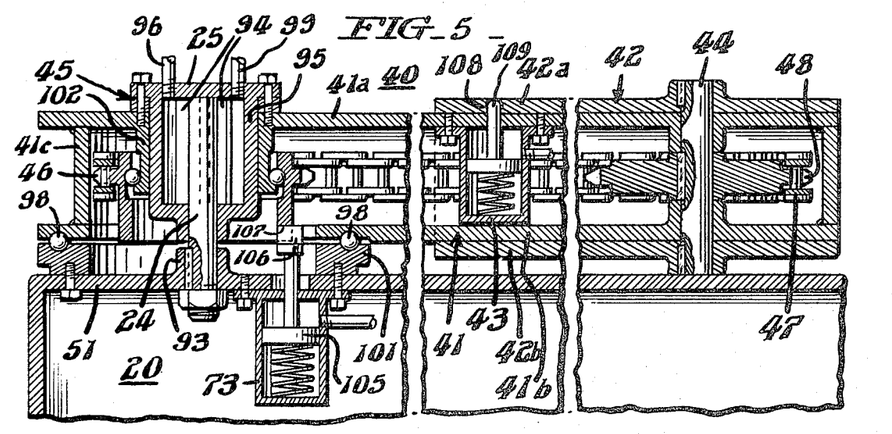
FIG. 5 is an elevational view in section, broken, of that portion of the vehicle shown in FIG. 4.

One suitable form of construction for the articulated two-section support arm is illustrated in cross section in FIG. 5. In FIG. 5, the fluid torque motor 45 has a center shaft 24 which is the axis 24 about which the inner arm 41 is pivotally movable. Center shaft 24 projects downward from the motor housing 95 and is keyed against rotation in boss 93 of the chassis frame 51. The vanes 94 of the fluid torque motor 95 are fixed to the shaft 24. Thus, vanes 94 are fixed against rotation. As seen in FIG. 6, stops 92 are fixed to the inner surface of the cylindrical housing 95 and project radially inwardly therefrom.

Since the shaft 24 and the vanes 94 are fixed against rotation, the application of fluid pressure through the flexible conduit 96, 99 drives the motor housing 95 rotationally. Motor housing 95 is fixed to inner arm 41 of the articulated support arm so that rotational movement of the motor housing 95 causes angular movement of arm 41 about the fixed shaft 24. Bearings 98 and annular race 101 provide the necessary friction-free support for the arm 41.

An annular ball-bearing race 102 is fixed to and embraces the motor housing 95, and the bearings in race 102 support an annular sprocket 46.

A locking cylinder 73 is fixed to the chassis frame 51. Cylinder 73 has a spring-loaded piston 105 the projecting end of which is provided with a rectangular head 106 adapted to be received into a rectangular slot or well 107 provided in the lower wall of the sprocket 46, and when so received locks the sprocket 46 against rotational movement. The piston 105 is retractable by fluid pressure under the control of solenoid valve 70 (FIG. 6).

Sprocket 46 is provided with a chain 47 which at its other end embraces a second sprocket 48 which is of equal size and has the same number of teeth as sprocket 46. Sprocket 48 is keyed to a shaft 44. Outer arm 42 is also keyed to shaft 44. Shaft 44 constitutes the pivot point about which the outer arm 42 swings.

As seen in FIGS. 1–5, inner arm 41 is a box-like frame formed of top and bottom horizontal plates 41a and 41b and vertical side plate 41c. The bottom plate 41b is provided with a circular opening at one end through which projects the fluid motor shaft 24 and the extended plunger 105 of the sprocket locking cylinder 73.

Outer arm 31 is a C-shaped frame formed of a pair of spaced-apart horizontal plates, an upper plate 42a and a lower plate 42b, and a vertical plate 42c. Upper plate 42a is provided with a recess or well 108 for receiving plunger 109 of the spring-biased locking cylinder 43 mounted in arm 41. When plunger 109 is in well 108 the outer arm 42 is locked to inner arm 41. Plunger 109 is retractable by fluid pressure under the control of solenoid valve 70 (FIG. 6).

Figure 1:
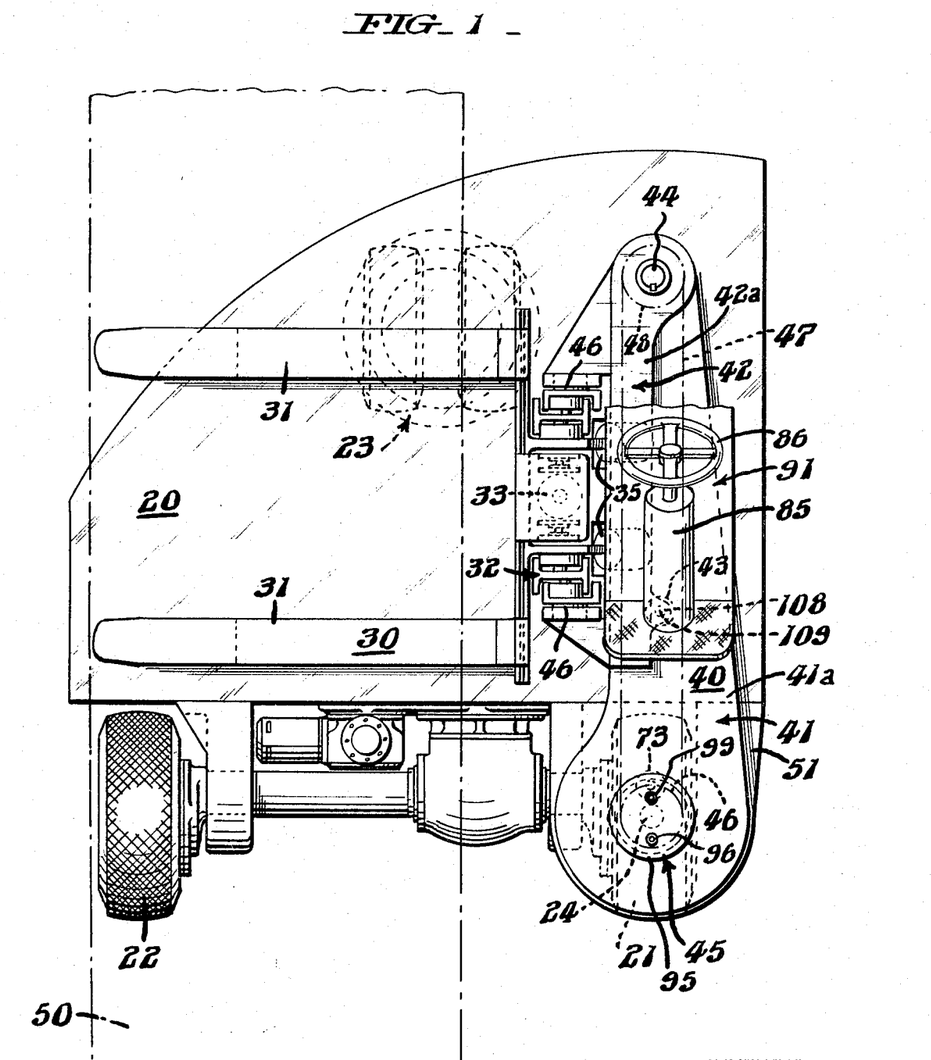
FIG. 1 is a top plan view of a vehicle embodying the present invention.
Figure 2:
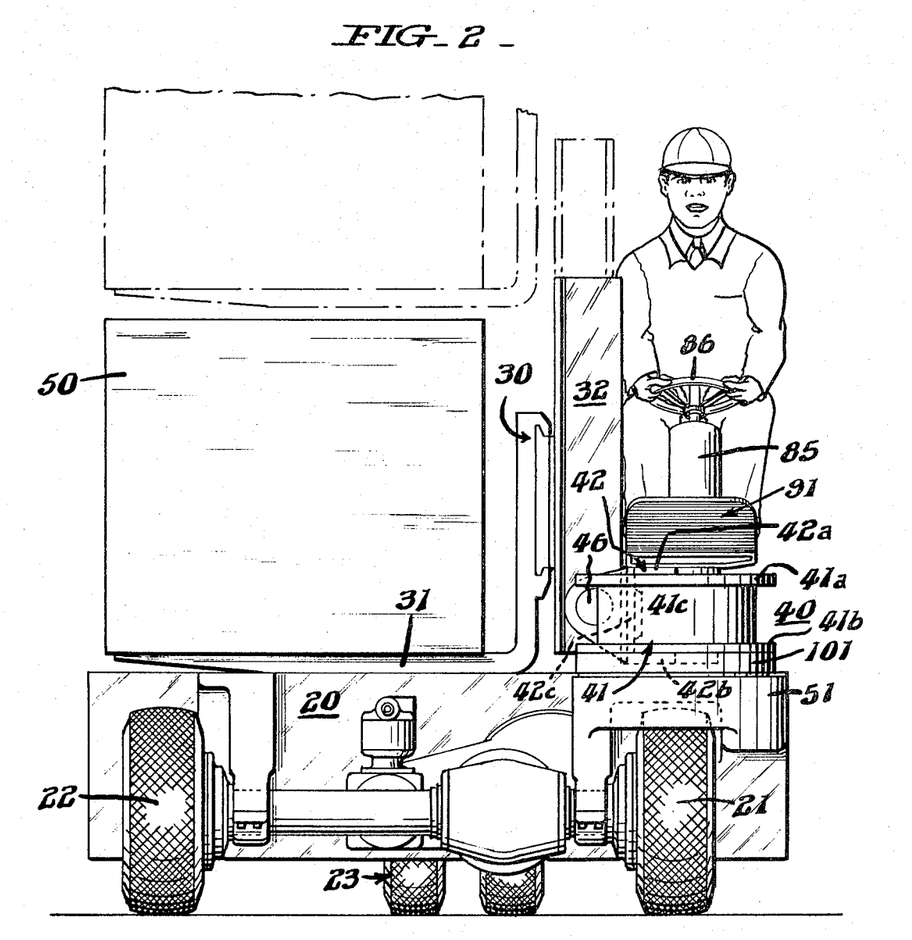
FIG. 2 is a front front elevation of the vehicle.
Figure 3:
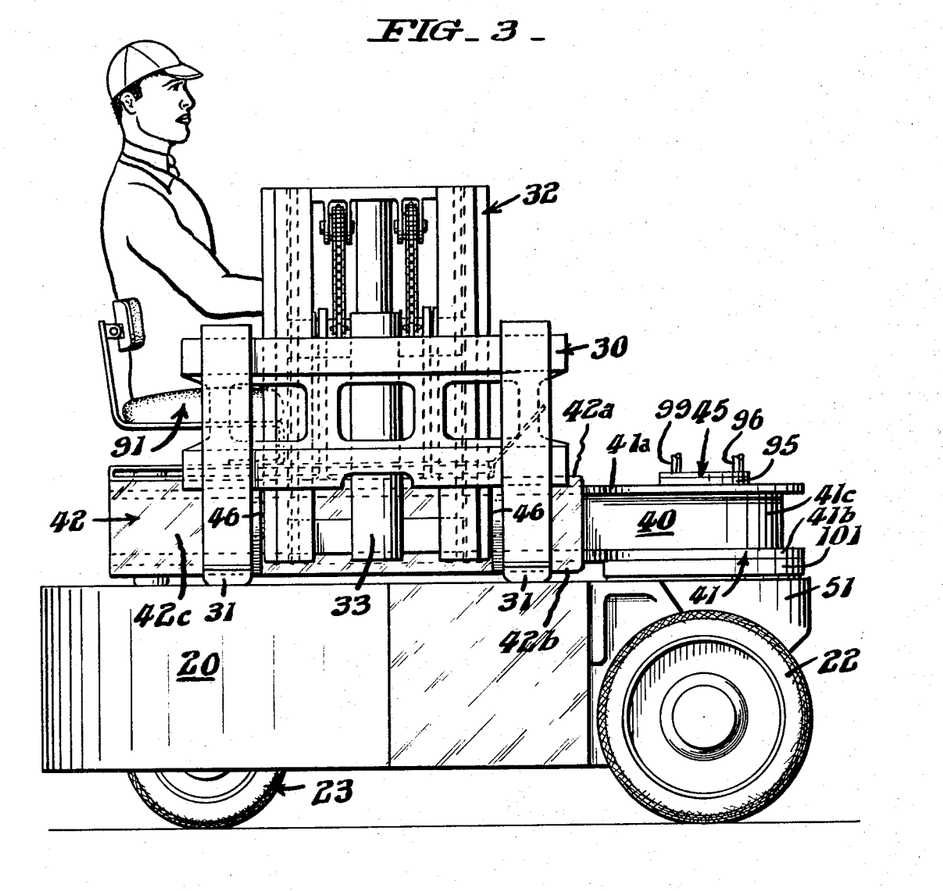
FIG. 3 is an elevational view of the right side of the vehicle.
Figure 4:
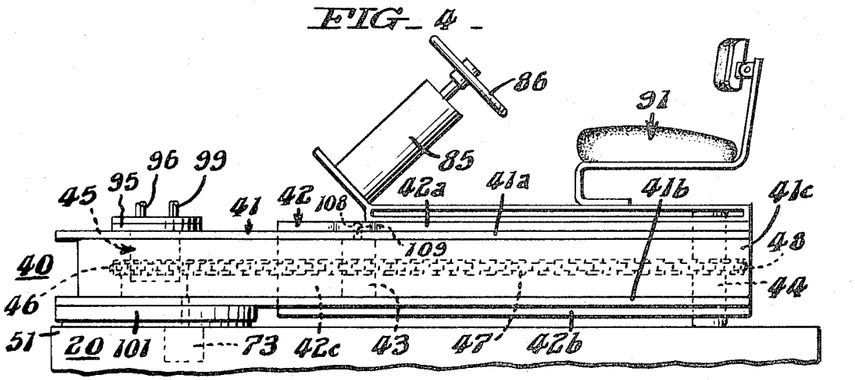
FIG. 4 is an elevational view of a portion of the left side of the vehicle.

Consider now what happens when fluid motor 45 is actuated in a direction to swing the arm 41 counterclockwise, as viewed looking down in FIG. 1, or into the paper as viewed in FIG. 5. When fluid pressure is so applied to motor 45, the motor housing 95 moves counterclockwise carrying with its arm 41 which moves on the bearings 98. The plunger 105 of the sprocket locking cylinder 73 is at this time in extended or locking position, and its head 106 is in the well 107, thereby preventing rotation of the sprocket 46. Plunger 109 of the mast locking cylinder 43 is at this time in retracted position, thereby allowing arm 42 to be moved relative to arm 41.

Figure 12:
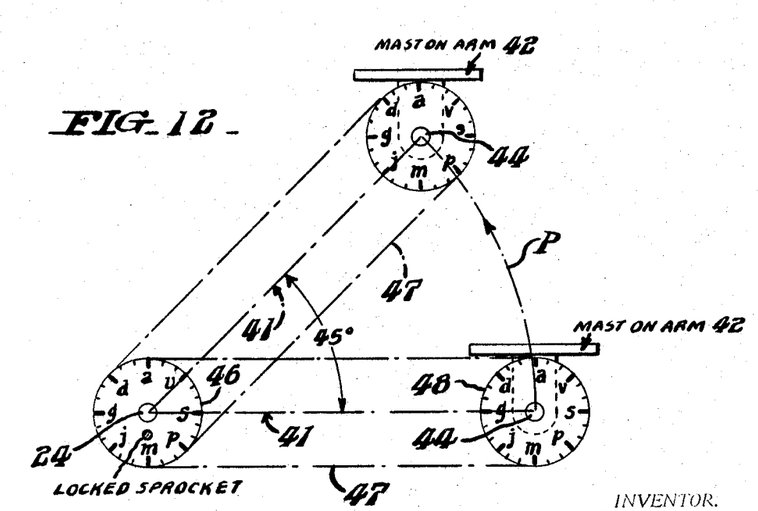
FIG. 12 is a diagrammatic illustration which will be helpful in understanding the operation of the vehicle in mode (A).

When arm 41 is moved counterclockwise, shaft 44 at the outward end of arm 41 is moved along an arcuate path, as illustrated in FIG. 12, and when shaft 44 is so moved, the chain 47 which is locked against rotation by the locked sprocket 46, causes the outer sprocket 48 to move rotationally in a clockwise direction as viewed looking down at FIG. 1. Since sprocket 48 is fixed to shaft 44, shaft 44 is caused to rotate clockwise on its own axis, thereby causing the outer arm 42 to move clockwise. With sprockets 46 and 48 of the same size, the angular distance through which outer arm 42 is moved is equal to the angular distance through which inner arm 41 is moved by the fluid motor 45.

The action described above may be readily understood by reference to FIG. 12. In FIG. 12, sprockets 46 and 48 and chain 47 are depicted graphically. The sprockets are of equal size and each is assumed to have 24 teeth, identified by the alphabetical letters a to x, every third letter being shown. The sprocket 46 is locked against rotational movement. When fluid motor 45 is actuated to move inner arm 41 counterclockwise, shaft 44 is carried along the arcuate path P indicated in dot-and-dash line in FIG. 12. Assume that the arm 41 is moved through an angular distance of 45°. Observe that before arm 41 is moved, the chain 47 is tangent to sprockets 46 and 48 at teeth a and m, but when arm 41 has been moved through 45° with sprocket 46 locked against rotation, chain 47 is tangent to sprockets 46 and 48 at teeth d and p. This is because sprocket 48, as it moved along the arcuate path, was forced by the chain 47 to move rotationally clockwise through an angular distance equal to that through which arm 41 was being moved.

It will be observed then that as the inner arm 41 is swung, counterclockwise in FIG. 12, the outer arm 42, carrying the mast and fork, rotates clockwise through an equal angle, and that as a result the orientation of the load relative to ground does not change. This explains why, in FIGS. 7, 8 and 9, the fork 30 retains the same orientation relative to the sides of the aisle 49 as the vehicle is moved from the position shown in FIG. 7 to the position shown in FIG. 9.

The operation illustrated in FIGS. 7, 8 and 9, if taken in that order, show how the load 50 is withdrawn from the stack. If these figures are taken in reverse order, they show how the load 50, tucked on the side of the vehicle (FIG. 9), is placed in the stack (FIG. 8), and the fork then withdrawn (FIG. 7).

The operation illustrated in FIGS. 7–9 has been referred to herein as operation in mode (A).

Consider now how the vehicle operates in mode (B), illustrated in FIGS. 10 and 11. Assume that the load 50 is on the tines 31 of the fork as shown in FIG. 10 and that the vehicle is to be swung under the load as illustrated in FIG. 11. The outer arm 42 is locked to the inner arm 41 by the plunger 109 of the mast locking cylinder 43. The sprocket locking cylinder 73 is however unlocked, that is, the solenoid valve 70 is actuated to place the plunger 105 in the retracted position.

To swing the vehicle about the pivot shaft 24, the left front wheel 21 is locked by the brake 221 (FIG. 6) and the right front wheel 22 is driven forwardly. The frame 51 (FIG. 5) lying to the right of pivot shaft 24 moves counterclockwise (into the paper as viewed in FIG. 5), and shaft 24 and the vanes 94 of the fluid motor 25 move rotationally counterclockwise. Fluid pressure to motor 25 is so controlled as to hold the motor housing 95 stationary, thereby to hold the arm 41 stationary. With the arm 41 maintained stationary, the sprocket 46, chain 47, sprocket 48 and outer arm 42 also remain stationary, as the chassis of the vehicle is swung about the pivot shaft 24. Thus, the load remains stationary as the chassis is swung under the load.

While the preferred embodiment of this invention has been described in some detail, it will be obvious to one skilled in the art that various modifications may be made without departing from the invention as hereinafter claimed.

Having described my invention, I claim:

1. A forklift vehicle comprising a chassis; an articulated two-section support comprising an inner arm and an outer arm, said inner arm being pivotally connected at its inward end to a corner portion of said chassis, said inner arm being pivotally connected at its outward end to the inward end of said outer arm; an elevatable mast and fork mounted on said outer arm; power means for driving said inner arm pivotally about the inward pivot located at said corner portion of said chassis; and means coupled between the inward and outward pivot for moving said outer arm pivotally about the outward pivot through an angle equal to the angle through which said inner arm is driven about the inward pivot, but in the opposite direction, thereby to maintain the orientation of said fork relative to ground, said means coupled between said inward and outward pivots including a first sprocket at said inward pivot, a second sprocket at said outward pivot, a chain coupling said first and second sprockets, and means locking said first sprocket against rotation when said inner arm is driven pivotally about said inward pivot.

2. A forklift vehicle as claimed in claim 1 characterized by the provision of means for locking said outer arm to said inner arm; and further characterized by the provision of means for swinging said chassis about said inward pivot while maintaining said inner and outer arms substantially stationary relative to ground, and means for unlocking said first sprocket during said swinging of said chassis.

3. A load lift vehicle comprising a chassis; an articulated two-section support comprising an inner arm and an outer arm, said inner arm being pivotally connected at said inward end to a corner portion of said chassis, said inner arm being pivotally connected at its outward end to to the inward end of said outer arm; an elevatable mast and load support mounted on said outer arm; means for driving said inner arm pivotally about the inward pivot located at said corner portion of said chassis; means coupled between the inward and outward pivot for simultaneously moving said outer arm pivotally about the outward pivot through an angle equal to the angle through which said inner arm is being driven about the inward pivot, but in the opposite direction, thereby to maintain the angular position of said load support relative to ground; locking means for locking said outer arm to said inner arm; and means for swinging said chassis about said inward pivot while maintaining said inward and outer arms substantially stationary relative to ground.

4. A load lift vehicle according to claim 3 characterized in that said vehicle is provided with two non-steerable front wheels, one at each front corner of the chassis, and a steerable centered rear wheel assembly; further characterized in that said inner arm is pivotally connected to a front corner portion of the chassis, and in that means are provided for driving the front wheels.

5. A load-lift vehicle according to claim 4 characterized in that the means for driving the front wheels are connected to the means for driving the inner arm of the two-section support, whereby said vehicle may be driven in a straight line in a coordinated motion with the pivotal movement of the inner and outer arms of the articulated two-section support.

6. A forklift vehicle as claimed in claim 3 characterized in that said means for driving said inner arm pivotally includes a fluid torque motor having a center shaft positioned on said inward pivot.

7. A forklift vehicle as claimed in claim 6 characterized in that said shaft of said fluid torque motor is keyed in said chassis against rotation and in that the housing of said motor is rotatable, said motor housing being fixed to said inner arm.

8. A load-lift vehicle comprising: a chassis; a vertical support at a front side corner of said chassis, said chassis having a load-containing area extending from the opposite side of said chassis inwardly to at least the center line thereof; an articulated two-section support comprising an inner arm and an outer arm, the inward end of said inner arm being pivotally connected to said corner vertical support means, said inner arm being pivotally connected at its outward end to the inward end of said outer arm; an elevatable mast and load-support means mounted on said outer arm; means for driving said inner arm pivotally about the corner vertical support; and means coupled between the inward and outward pivot for moving said outer arm simultaneously through an angle equal to the angle through which said inner arm is being driven about the corner pivot, but in the opposite direction, thereby to maintain substantially fixed the angular position of said load-support means relative to ground; and drive means for driving said vehicle.

9. A load-lift vehicle according to claim 8 characterized in that said drive means includes means for driving said front wheels, and in that said drive means are interconnected with the means for driving the inner arm of the articulated two-section support.

10. A load-lift vehicle according to claim 9 characterized in that the inner arm of said two-section support has a length substantially equal to the width of said chassis.

11. A load-lift vehicle according to claim 8 characterized in that said drive means include means for swinging said chassis about said corner pivot while maintaining said inner and outer arms substantially stationary relative to ground, thereby to maintain the load-support means substantially stationary relative to the ground.

12. A load-lift vehicle according to claim 11 characterized in that said drive means for swinging said chassis includes means for driving said front wheels.

References Cited

UNITED STATES PATENTS

| 2,753,066 | 7/1956 | Arnot. |
| 3,189,205 | 6/1965 | Quayle _____________ 214—670 |

ALBERT J. MAKAY, *Primary Examiner.*